Jan. 25, 1955 — W. C. WALLER — 2,700,274
LINK FOR CHAIN COMPRISING DETACHABLE U-SHAPED SECTIONS
Filed June 26, 1952 — 2 Sheets-Sheet 1

INVENTOR.
William C. Waller
BY Eugene E. Stevens
His ATTORNEY.

Jan. 25, 1955     W. C. WALLER     2,700,274
LINK FOR CHAIN COMPRISING DETACHABLE U-SHAPED SECTIONS
Filed June 26, 1952     2 Sheets-Sheet 2
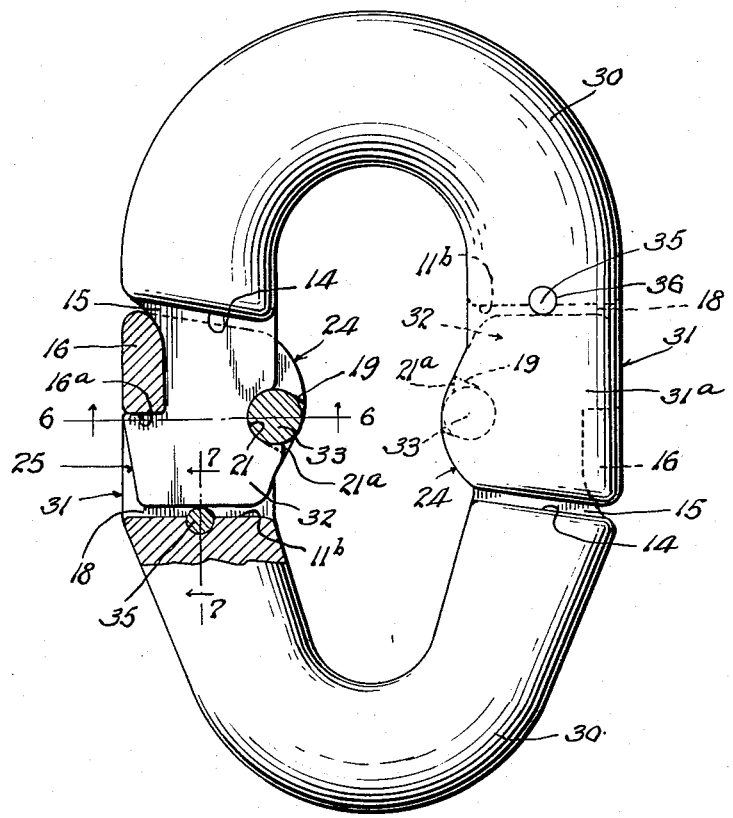
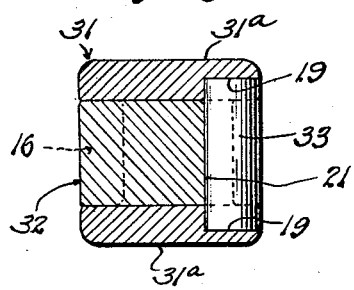
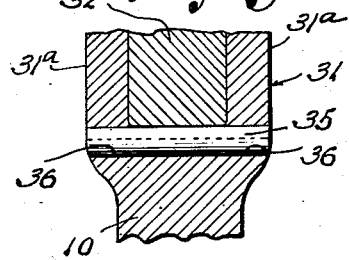
INVENTOR.
William C. Waller
BY
*Eugene E. Stevens*
His ATTORNEY.

United States Patent Office 2,700,274
Patented Jan. 25, 1955

2,700,274

LINK FOR CHAIN COMPRISING DETACHABLE U-SHAPED SECTIONS

William C. Waller, Sherman Oaks, Calif.

Application June 26, 1952, Serial No. 295,701

9 Claims. (Cl. 59—85)

My invention relates to improvements in connecting or repair links for chains and the like and it has for its primary object to provide a novel and improved link of this character which is of the separable section type and while eliminating a center spacer or bridge segment will have substantially the same strength as an integral one-piece link of the same size.

The invention also aims to furnish a link as characterized which is simple in construction, economical to manufacture, easy to assemble and highly efficient in practical use.

Another important object of the invention is to eliminate all eccentric bending action of the link under load and to provide load supporting members all of which are in double shear.

More specifically, the invention contemplates a separable section repair link or the like which includes as an important element of its load sustaining means a sleeve or pin form means which is in double shear and in addition thereto removable means for holding the sections assembled but which is not subjected to the load carried by the link.

The foregoing and other objects will be readily understood and appreciated by those skilled in the art upon reference to the accompanying drawings in connection with the following detailed description of two forms of my inventive concept.

It is to be understood, however, that the invention is susceptible of other mechanical expressions within the spirit and scope of the subject matter claimed hereinafter.

In the drawings, wherein the same reference characters have been used to designate the same parts throughout the several views—

Fig. 5 is a plan view partly broken and partly in section of a slightly modified form of my link;

Fig. 6 is a cross-sectional view taken on the line 6—6 of Fig. 5; and

Fig. 7 is a sectional detail taken on the line 7—7 of Fig. 5.

Figure 1:
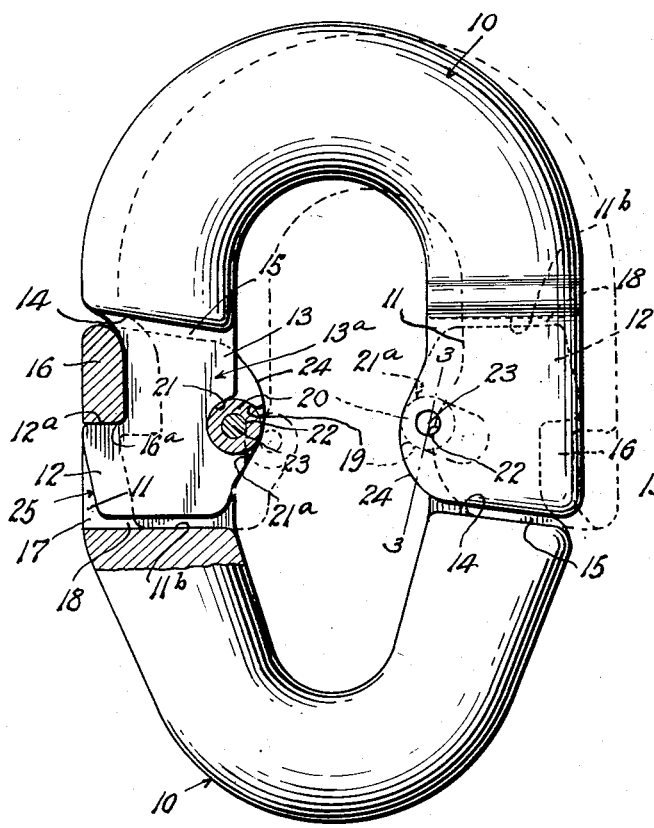
Fig. 1 is a plan view of a link partly broken and partly in section, and embodying my invention.

Referring to the drawings by reference characters and turning first to the form of invention shown in Figs. 1, 2, 3 and 4, numeral 10 designates identical and generally U-shaped link halves each of which has one leg terminating in a socket 11 and the other in a stud 12, which latter is adapted to be received in the socket 11 of the companion link half or section 10.

The sockets 11 are open at their outer ends and at their inner sides, which latter are opposed to one another when the sections 10 are assembled as indicated in Fig. 1. Also each socket portion 11 has the bridge-providing partial back wall 16 as shown which connects the socket side walls 11a (see Figs. 1, 2 and 3).

Figure 2:
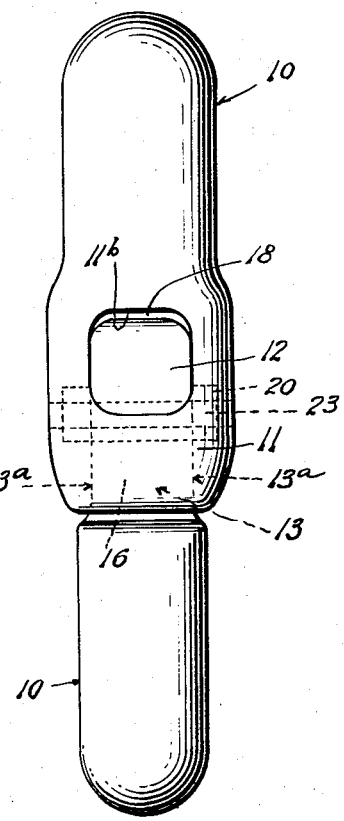
Fig. 2 is a side elevation of the same.
Figure 4:
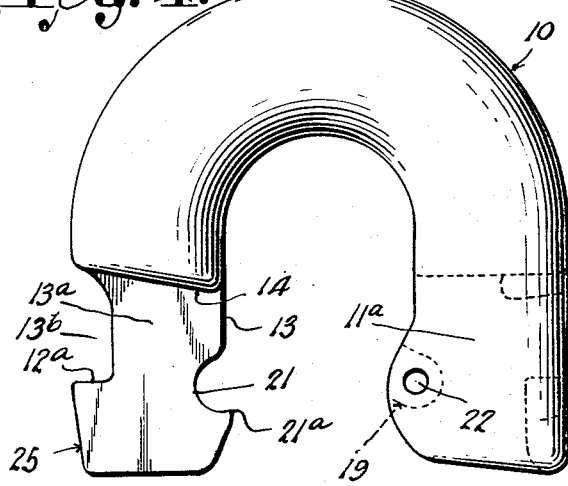
Fig. 4 is a plan view of one U-shaped section of the link.

As shown each stud 12 and its shank portion 13 is somewhat reduced in thickness as compared to the adjacent leg portion of the related section 10 and has flattened top and bottom sides 13a which extend the entire length of said stud and shank portions 12, 13 as indicated in Figs. 1 and 2.

The top and bottom shank portion surfaces 13a of each stud terminate in a transverse diagonal or outwardly slanting shoulder 14 (see Fig. 1) which shoulders are spaced as shown at 15 from the similarly slanted and parallel outer ends of the socket side walls 11a. Spaces 15 function with other spaces 18 to admit of assembly of sections 10 as will be presently explained.

The outer edge of each shank portion 13 is cut away to define the inner end shoulder 12a of the related stud 12 and also to provide the recess 13b which receives the bridge portion 16 of the socket 11 of the companion link section as indicated in Fig. 1.

The inner end of the bridge portion 16 of each socket 11 terminates well short of the inner socket end 11b so as to provide the stud-receiving hole 17 and the load sustaining shoulder 16a which is engaged by the shoulder 12a of stud 12 of the companion section 10 when the parts are assembled in service position as indicated in Figs. 1 and 2.

Figs. 1 and 2 also illustrate that when the link halves 10 are assembled there will be the space 18 between the free end of each stud 12 and the inner end 11b of the related socket 11. Spaces 18, 15 function as heretofore intimated to admit of assembly of the halves or sections 10 as will be explained shortly.

Figure 3:
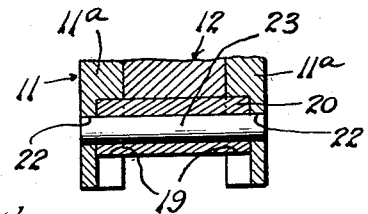
Fig. 3 is a sectional detail taken on the line 3—3 of Fig. 1.

As best shown in Figs. 1 and 3 the opposed side walls 11a of each socket 11 have interior surface grooves 19 arranged in opposition to one another and extending diagonally inward from the inner side socket opening toward the outer end of socket bridge 16. When the halves 10 are assembled as in Fig. 1 these pairs of grooves 19 are parallel and each pair receives the outer ends of a load-sustaining sleeve element 20 whose intermediate portion is also adapted to engage in the curved load-sustaining seat 21 which is provided across the inner longitudinal edge of the stud 12 of the companion section 10. Each sleeve 20 makes a snug fit in its stud seat 21, and a snug sliding fit in the related socket wall grooves 19 to the closed and sustaining inner ends of the latter. Thus, said sleeves 20 cooperate with the interengaging bridge and stud shoulders 16a, 12a (see Fig. 1) to sustain the link load.

It is to be noted from an inspection of Fig. 1 that the sleeve-receiving seat 21 of each stud 12 has an inwardly extended wall or lip 21a adjacent the free end of the stud so as to provide a better load-sustaining portion as will be fully understood later on.

In order to hold the halves or sections 10 assembled I provide the opposed side walls 11a of each socket 11 with aligned holes 22 for receiving the ends of a locking pin 23 which is extendable through the related sleeve 20 when the latter is at the inner end of its grooves 19, as indicated in Fig. 3. However, the fit of sleeves 20 in the related socket wall grooves 19, 19 is such that none of the link load is transferred to pins 23.

From the foregoing it will be understood that in service, the lineal load to which the link 10, 10 is subjected will be sustained by engagement of the lug shoulders 12a with socket bridge shoulders 16a; and also, as earlier noted, by sleeves 20, acting through the stud seats 21, 21a and the socket grooves 19.

To disassemble the link 10, 10 it is only necessary to drive out the pins 23 whereupon the halves or sections 10 can be moved in opposite directions to the dotted line position of Fig. 1. This line of movement is parallel to the longitudinal axes of the pairs of sleeve-receiving grooves 19 of the socket side walls 11a. After the respective sleeves 20 have been aligned with the outermost wall terminal of their receiving grooves 19, as indicated in dotted lines in Fig. 1, the link halves or sections 10 can simply be pulled laterally to effect complete separation.

To assemble the sections 10 the recited procedure is of course reversed. Should the stud seat lips 21a be omitted, as they may be, assembly of the parts will be facilitated by locating the halves 10 in the full line position of Fig. 1 before installing the sleeves 20. Application of locking pins 23 is of course the final step.

Referring to the form of invention shown in Figs. 5–6, inclusive, the link halves or sections 30, 30 with certain minor exceptions correspond to the previously-described sections 10, 10. Hence the Fig. 1–3 reference characters are employed in Figs. 5–6 where applicable.

The side walls 31a of the socket members 31 of Fig. 5 do not have aligned holes at the site of pin grooves 19 corresponding to 22 of Figs. 1 and 3 for pins such as 23 of Fig. 1; and in lieu of the Fig. 1 sleeves 20 the Fig. 5 form of the invention has solid pins 33 received in the diagonal inner surface grooves 19 of opposed walls of the socket 31.

To keep the sections 30, 30 from shifting from the load-supporting position illustrated in Fig. 5 I provide a locking pin 35 which is inserted through aligned holes 36 in the opposite side walls 31a of each socket 31 to abut the free end of the seated stud 32. Thus pins 35 function the same as pins 23 of Fig. 1. The ends of studs 32 may have recesses to receive the locking pins 35 but this is not essential.

Each of the Fig. 1 and Fig. 5 illustrations also discloses the socket members as having the inwardly extending cam portions 24 which protect the sleeves 20 or locking pins 33 from damage in service as will be readily understood.

Referring to Figs. 1 and 5 the distance longitudinally of the stud leg from the lip ends 21a to the adjacent walls of opposed grooves 19 for sleeves 20 (Fig. 1) or pins 33 (Fig. 5) is the same as the width of spaces 15, 18. Thus following removal of the locking pins 23 (Fig. 1) or 35 (Fig. 5) and the diagonal shifting of the link halves to the dotted line position of Fig. 1, the outer ends of lips 21a will register with the adjacent walls of the related diagonal grooves 19 so as not to interfere with the final complete separation of the link halves or removal of the Fig. 1 sleeves 20 or the Fig. 5 pins 33.

On the subject of the lip ends 21a of the stud-provided sleeve or pin seats 21 of Figs. 1 and 5, it has been noted that the stud lips function to improve the load-sustaining and transferring capacity of the seats. However, such seat lips 21a of Figs. 1 and 5 also function to retain the sleeves 20 (Fig. 1) or pins 33 (Fig. 5) in their grooves 19 and force them to the inner ends of the latter when the link halves are being assembled. Also such lips 21a retain the sleeves 20 (or pins 33) in the inner ends of their grooves 19 prior to application of the locking pins 23 (Fig. 1) or 35 (Fig. 5). These last two stated functions of lips 21a are an important consideration with the Fig. 5–6 form of my invention but are of considerably less moment as to the Fig. 1 form of it.

Adverting to previous mention of the function of the spaces 15, 18 as functioning to admit of assembly of the link halves, it will now be clear that they are employed to permit movement of the link halves from the full line position to the dotted line position of Fig. 1—and vice versa. Such spaces must be of a width equal to the movement of sleeves 20 (Fig. 1) or pins 33 (Fig. 4) longitudinally of the link legs in their travel from the outer ends of the diagonal grooves 19—and vice versa.

As shown in Figs. 1 and 5, the backs of the respective studs 12, 32 taper inwardly as at 25 toward the free ends of same. This is to compensate for the inward projection of lips 21a so as to facilitate projection of the stud end of a link half 10 (or 30) through the link of a chain end.

Having thus described my invention, what I claim is:

1. A separable section link for chains and the like comprising in combination a pair of duplicate substantially U-shaped sections, an outwardly extending stud at the end of one leg of each section, said stud providing a load sustaining shoulder at its inner side; a socket at the outer end of the other leg, each of said sockets having spaced parallel side walls and being closed at its inner end and open at its outer end and at its inner side; a bridge wall connecting said side walls of each socket adjacent the open outer end of same, the inner edge of each bridge wall terminating short of the inner end of said socket and providing a load-sustaining shoulder spaced from the inner end of the socket a distance greater than the width of the stud of the other section to provide a receiving recess therefor; the load-sustaining shoulders of adjacent studs and socket bridges engaging when the sections are assembled in service relationship and leaving a space between the outer side of each stud and the inner end of the socket which seats the same; each of said studs having a shank portion as an extension of its link section leg and opposite sides of each stud and its shank portion being coextensively cut away and providing a transverse shoulder at the inner end of said shank portion at each of its said sides; said stud shank portion shoulders being spaced from the opposed outer end of the adjacent socket when the link halves are assembled in service relationship; opposed side walls of each socket having aligned diagonally extending interior surface grooves opening from the open inner sides of said sockets and closed at their rear ends, said pairs of socket grooves being parallel with one another when the link sections are assembled and are in the process of being assembled, the closed ends of the grooves being closer to the outer end of the socket than the inner ends; load-sustaining and transferring pin form means removably carried in the grooves of each socket and seatable in the inner ends of said grooves; a load-sustaining seat in the rear edge of each stud shank and engaging said pin form means when the link sections are assembled in service relationship, and socket-carried holding means which is at least substantially free of load sustained load for preventing relative movement of the link sections when assembled in service position.

2. The combination set forth in claim 1, and each stud shank seat having an inwardly projecting lip at the side nearest the free end of said shank and which lip overlies a part of the adjacent socket grooves while engaging said pin form means when the link sections are in service relationship but which lip moves clear of said grooves when the link sections are moved a predetermined distance in a separating direction parallel with said grooves.

3. The combination set forth in claim 1, and said socket-carried holding means comprising a pin engaging the outer side of the related stud.

4. The combination set forth in claim 1, and said pin form means comprising a sleeve, and said socket-carried holding means comprising a pin extending through said sleeve.

5. The combination set forth in claim 1, and said socket-carried holding means comprising a pin engaging the outer side of the related stud and each stud shank seat having an inwardly projecting lip at the side nearest the free end of said shank and which lip overlies a part of the adjacent socket grooves while engaging said pin form means when the link sections are in service relationship but which moves clear of said grooves when the link sections are moved a predetermined distance in a separating direction parallel with said grooves.

6. The combination set forth in claim 1, and said pin form means comprising a sleeve, and said socket-carried holding means comprising a pin extending through said sleeve, and each stud shank seat having an inwardly projecting lip at the side nearest the free end of said shank and which lip overlies a part of the adjacent socket grooves while engaging said pin form means when the link sections are in service relationship but which moves clear of said grooves when the link sections are moved a predetermined distance in a separating direction parallel with said grooves.

7. A separable section link comprising in combination, a pair of duplicate substantially U-shaped sections providing legs, each section having a socket formed in one of its leg ends and an outwardly projecting stud at the other leg end, each of said sockets providing spaced and opposed side walls and being open at its inner edge and free end but closed at its inner end, a seat-providing connection between the side walls of each socket adjacent the outer edge and free end of the latter, said studs and seats providing load-supporting shoulders which interengage when the sections are assembled, the load supporting seat shoulders being spaced from the closed inner ends of the sockets a distance greater than the width of the studs and the sections being relatively movable axially of said legs to separate said shoulders, the side walls of each socket having opposed inner surface grooves opening from the inner edges thereof, said grooves being closed at their inner ends and inclined toward the free end of the related socket, the closed inner ends of said grooves being closer to the open ends of the sockets than to the closed ends thereof, a removable load-sustaining and transferring pin extending across each socket and having its ends working in said grooves, the inner edge of the stud end of each leg having a transverse load-sustaining and transferring seat receiving said pin, and load-free locking means securing said sections in service relationship.

8. The combination set forth in claim 7, said pin means comprising a sleeve, and said locking means comprising a pin extending through the socket side walls and through said sleeve.

9. The combination set forth in claim 7 and said locking means comprising pin extending through said socket side walls and engaging the free end of said stud.

References Cited in the file of this patent
UNITED STATES PATENTS

| | | |
|---|---|---|
| 2,357,768 | Robbins | Sept. 5, 1944 |
| 2,385,232 | Robbins | Sept. 18, 1945 |
| 2,525,724 | Robbins | Oct. 10, 1950 |